March 15, 1966 E. STECHEMESSER ETAL 3,240,113
PICKUP AND PROJECTION MIRROR SYSTEM FOR PANORAMIC PHOTOGRAPHY
AND PANORAMIC PICTURE PROJECTION AT HORIZONTAL PLANE ANGLES
Filed Aug. 29, 1961 4 Sheets-Sheet 3

Inventors:

United States Patent Office 3,240,113
Patented Mar. 15, 1966

3,240,113
PICKUP AND PROJECTION MIRROR SYSTEM FOR PANORAMIC PHOTOGRAPHY AND PANORAMIC PICTURE PROJECTION AT HORIZONTAL PLANE ANGLES
Ernst Stechemesser, Gottingen-Geismar, and Victor Baumann, Walter Schaefer, and Richard Weber, Gottingen, Germany, assignors to Visophone International Establishment, Vaduz, Liechtenstein, a corporation of Liechtenstein
Filed Aug. 29, 1961, Ser. No. 134,600
1 Claim. (Cl. 88—24)

The present invention relates to a pickup and projection mirror system for panoramic photography and panoramic projection at horizontal-plane angles of view of up to 360 degrees, and also shows such mirror arrangements in practical use.

Known pickup and projection mirrors of spherical, conical or parabolic shape, or revolving mirrors are arranged in front of the lens of a camera of conventional design in a manner so that the virtual picture appearing thereon of the surrounding complete panorama of 360 degrees in the horizontal plane forms a ring-shaped image on the film.

For projection, the picture taken of an object appears as a ring-shaped image and is projected through means of a spherical, conical or parabolic mirror to a spherical or cylindrical projection screen. The projection mirror is arranged in front of the projector so that the projected ring-shaped image appears on the reflector surface completely and in a suitable position. The ring-shaped picture which has been distorted when the picture was taken, is corrected by reversing the photographic operation and forms an undistorted image on the projection screen. Nevertheless, the spherical, conical, parabolic or revolving mirrors used hitherto show numerous disadvantages so that no satisfying results were obtained.

With conical mirrors there is no angular enlargement of the projection field in a vertical line during projection so that the projected images are too flat even at a comparatively great angle of projection of the projector. Accordingly, when using conical mirrors for the photograph, only a very flat section of the 360-degree panorama is picked up which is also not satisfying.

Spherical and parabolic mirrors show unfavorable results in an exactly opposite way. The tangent planes of such mirrors pass through all positions, from a horizontal position in the vertex of the mirror to a vertical position at the equator in case of a sphere, and to an approximately vertical position in case of a parabolic mirror when the distance from the vertex is sufficiently long. With regard to the law of reflection, this means that even in vertical position such mirrors can enclose only an angle of image of up to approximately 180 degrees.

Contrary to conical mirrors, the pickup and projection field is enlarged when using spherical or parabolic mirrors, to an extent so that when taking a photograph a section of the 360-degree panorama is picked up which cannot be reproduced during projection.

The disadvantages of the enlarged angle of image in the vertical line appear especially during projection when the small-sized picture on the film is enlarged in vertical and horizontal direction to an extent so that the limit of picture definition of the film material produced today is by far exceeded. Enlargement is so great that even smallest irregularities or faults in the film material cause distinct image defects.

Furthermore, during the projection the light beam from the projector is distributed over a wide solid angle, so that it is not possible to obtain a satisfactory brightness of the picture on the projection screen. The projected image appears to be blurred, indistinct, and flat.

It is one object of the present invention to provide a pickup and projection mirror system for panoramic photography and panoramic picture projection, which eliminates these deficiencies and provides a practical pickup and projection mirror.

The present invention is based on the concept to limit, by means of suitably shaped mirrors, the vertical angle of image of the 360-degree picture and of the projection to reasonable mean values, without necessitating the fadeout of the excessive sections of the vertical field to limit the vertical angle of image which results in a highly unfavorable utilization of the picture screen and of the light, as was the case with the types of mirrors used hitherto.

It is another object of the present invention to provide a pickup and projection mirror system for panoramic photography and panoramic picture projection, wherein a mirror is used which forms a revolving body with a reflecting outer surface and which is produced by the rotation of a curved element about the mirror axis, said curved element being a convex sector having its center outside the body axis and intersecting the mirror axis at an acute angle. The mirror may be formed of a hollow body and have at its vertex a sufficienty large opening arranged concentric to the body axis of the mirror. In front of the opening of the mirror and opposite the reflecting outer surface there may be arranged another reflector.

The arrangement in accordance with the present invention may be used for all types of panoramic photography and panoramic projection, as for instance in devices used for advertising purposes. In this case, a still or moving-picture projector is accommodated in a suitable frame on which is mounted a truncated-cone shaped top of transparent, frosted and suitable material, as for instance glass, plastic material or the like, in the center of which is arranged a convex, spherical, or conical mirror or a corresponding mirror lens objective in a manner, so that through means of this mirror the 360-degree picture is projected from the projector in the lower part either directly or after previous reversal over a plane mirror surface. The truncated cone may stand upright, i.e. with its vertex either upwards or upside-down.

With these and other objects in view, which will become apparent in the following detailed description, the present invention will be clearly understood in connection with the accompanying drawings, in which.

Figure 1:
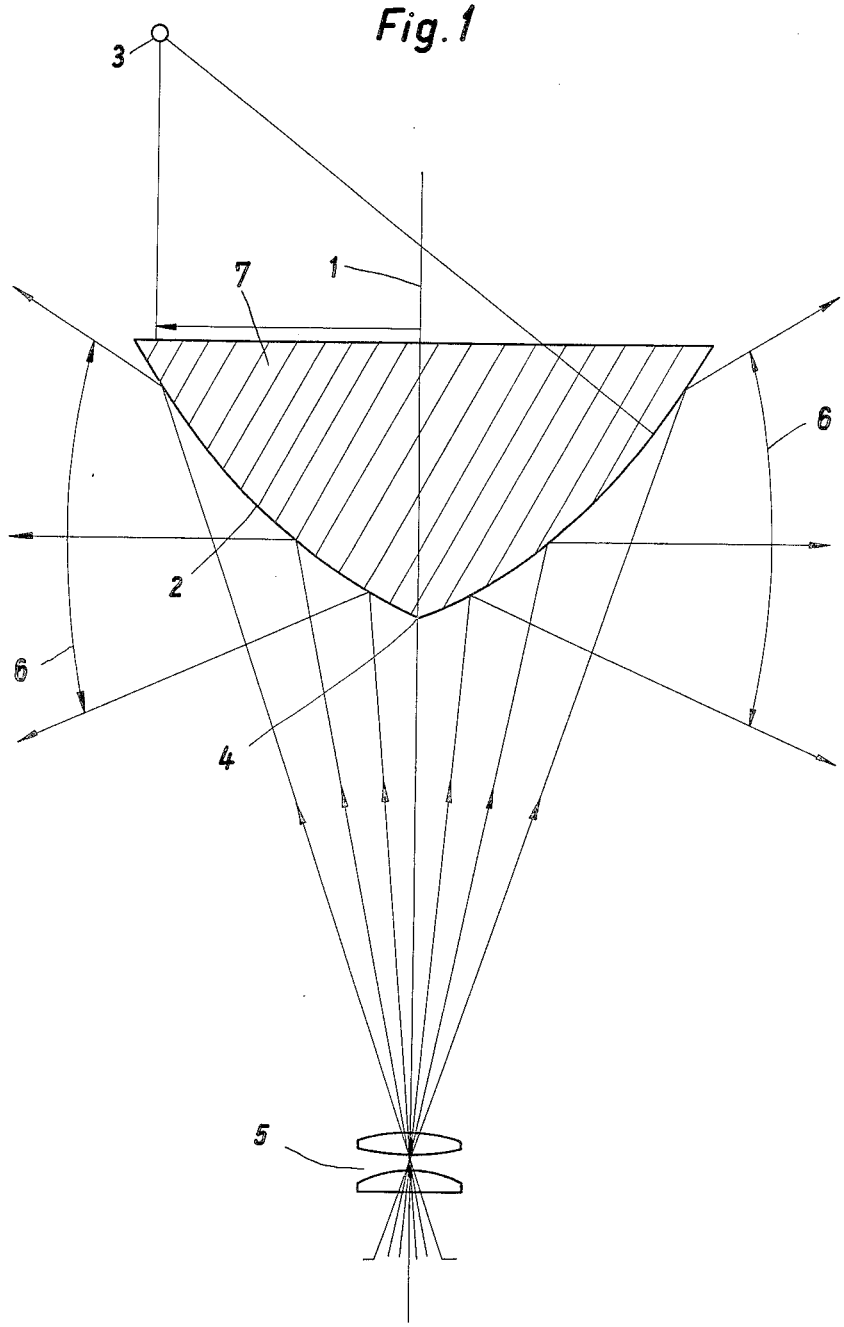
FIGURES 1 and 2 are different embodiments of the mirror system.
Figure 2:
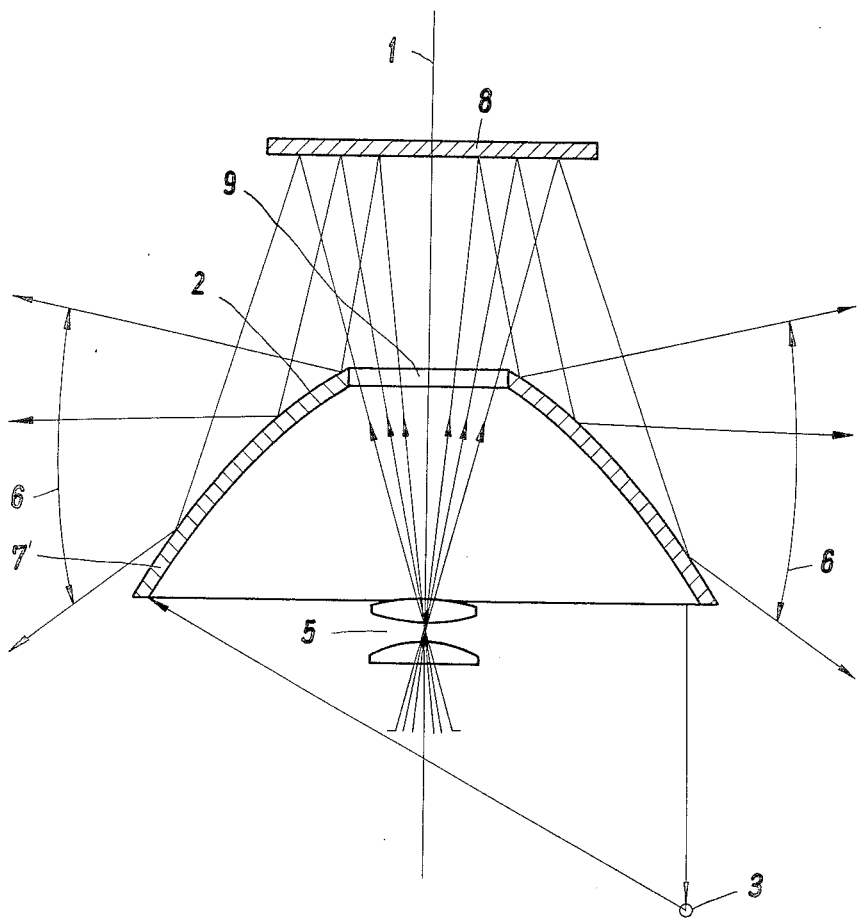
Figure 3:
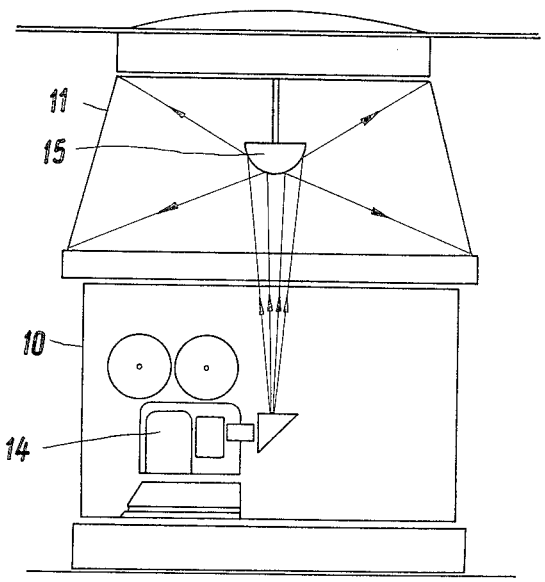
FIGS. 3 to 6 are different embodiments of advertising columns employing the mirror system in accordance with the present invention.
Figure 4:
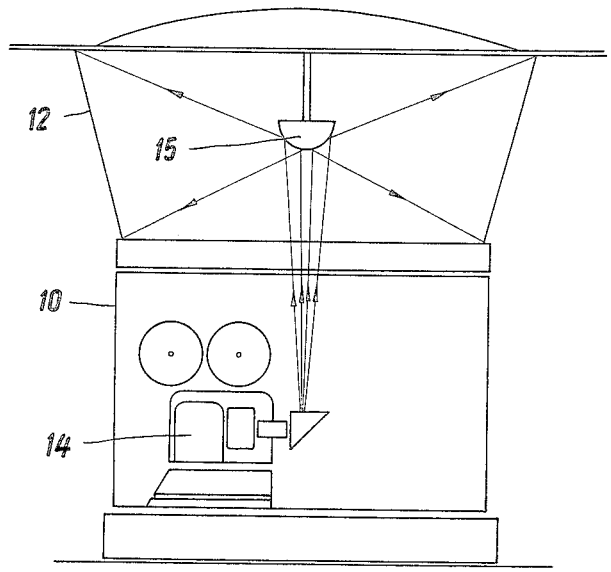

Referring now to the drawings, and in particular to FIGS. 1 and 2, the pickup and projection mirror designed according to the present invention is formed of a revolving body having a reflecting outer surface and is produced by the rotation of a convex sector about the axis of the mirror body, the sector intersecting the axis at the vertex of the mirror at an acute angle, and the center of the circle of the sector being outside the body axis. In a sectional view through the mirror arrangement on the line of the axis 1, the outer surface 2 of the mirror body 7 forms a circular line around a center 3 of a circle, which center 3 is outside the body axis 1.

During projection, the rays fed from an objective 5 of a conventional projector impinge on the reflecting surface 2 and are, with the exception of a few rays which fall on the vertex 4 of the mirror, reversed within a lateral vertical field of projection 6 which extends over the periphery of the mirror body 7. Practically, all of the rays emerging from the objective 5 are utilized for the projection within the desired angle 6 and over the periphery of the mirror body 7.

Almost the complete light beam coming from the projector 5 is thus concentrated on the predetermined field of projection 6. It is possible, thereby, to produce on a cylindrical, spherical or conical projection surface surrounding the mirror, a brilliant picture and, because of the smaller enlargement of the surface by limitation of the angle, a sharp picture. The same can be said for taking the picture.

Another embodiment of the present invention is illustrated in FIG. 2. Here, a mirror 7' is used which in this case forms a hollow body provided with an aperture 9 and which cooperates with a reflector 8 which is arranged at a suitable distance above and concentric with the mirror 7'.

During projection, the rays emerging from the objective 5 pass through the aperture 9 in the vertex of the mirror 7'. They impinge on the reflector 8, from where they are reflected to the reflecting surface 2 of the mirror 7' and from here to the projection screen (not shown).

When taking a picture, the path of the rays is in reversed direction, and a camera takes the place of the projector.

Besides plane mirrors, spherical, conical, convex or revolving mirrors according to the present invention may be used as the reflector 8. For the mirror system shown in FIG. 2 it is also possible to use the mirror in upright, reversed or inclined position as seen relative to the mirror vertex.

With horizontal angles of image of up to 360 degrees, the mirror designed in accordance with the present invention obtains, by limiting the vertical angle of image to the desired field of image, a reduction of picture definition, a greater concentration of the light beam, and thus a decisive improvement of picture brilliance and quality. This is especially advantageous for advertising columns shown diagrammatically in FIGS. 3 to 6.

Figure 5:
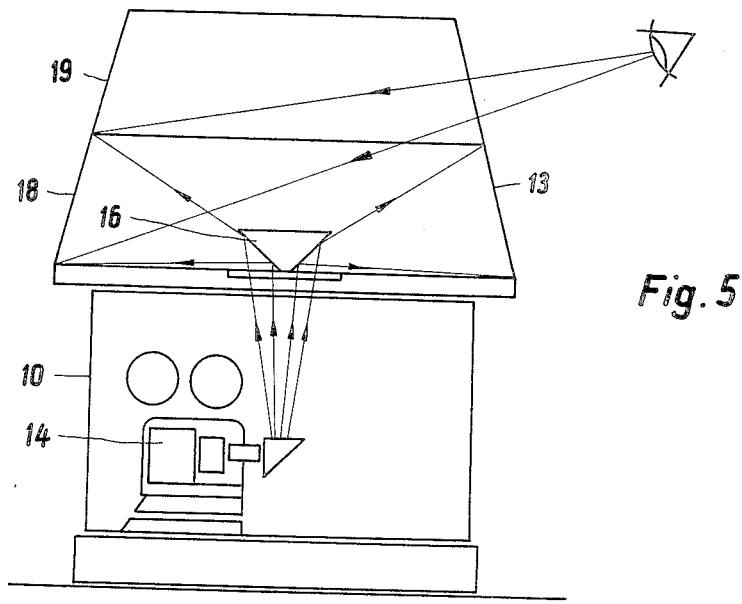

Devices of this type comprise a frame 10 or 20, accommodating a moving or still picture projector 14. Mounted on the frame, there is an upper part 11, 12 and 13, respectively, of translucent, frosted and suitable material, as glass, plastic material or the like which is shaped like an upright truncated cone (FIG. 3) or an upside-down truncated cone (FIG. 5). Inside this upper part, there is a convex, spherical or conical mirror or a corresponding mirror lens objective 15, 16, or 17, respectively, through means of which the 360-degree image is projected from the moving or still-picture projector 14 either directly or after previous reversal by a plane mirror surface to the truncated-cone shaped projection surface 11, 12, or 13, from inside.

In the arrangement shown in FIG. 5, the upper part 13 consists of a surface 18 of translucent, frosted and suitable material, and of one or more surfaces 19 above or below the surface 18, of transparent, clear material. The spectator can also see the opposite parts of the projection surface, so that from his position he can see almost the complete 360-degre panorama.

Figure 6:
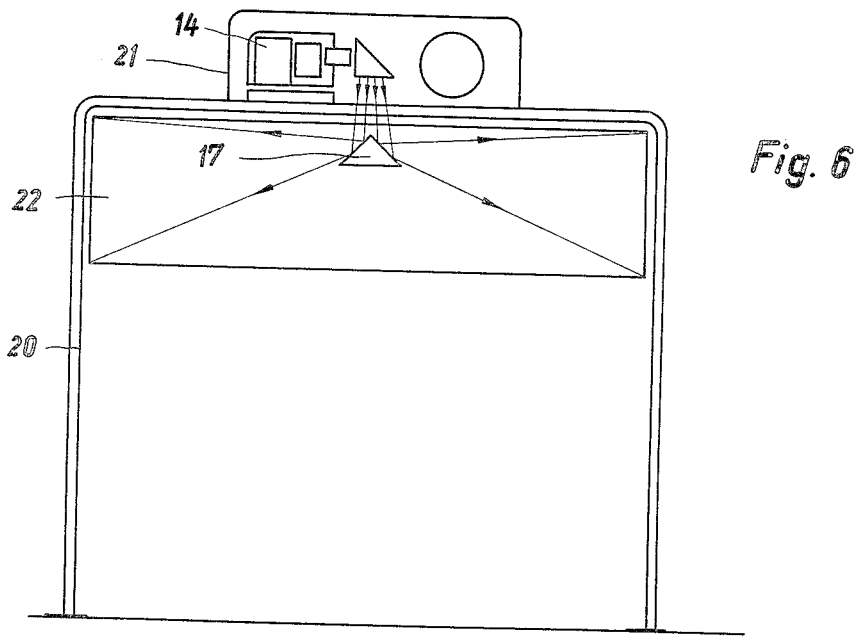

The apparatus illustrated in FIG. 6 offers the same possibilities. Furthermore, it is also possible to see the complete panorama from inside the apparatus.

In a frame 20, a housing 21 and a reflector 22 shaped like a truncated cone, a partial sphere or a cylinder is provided. The housing 21 accommodates a moving or still-picture projector 14, so that it projects the image of the 360-degree panorama to the projection surface 22 from inside, either directly or after reversal by a plane mirror surface, through means of a convex, a spherical or conical mirror 17 or a mirror system in accordance with the present invention, which is arranged concentric with and inside the projection surface 22 and below the projector 14.

With an apparatus as set forth above, the picture can be seen from outside and inside when the spectator stands below the depending projection surface 22, from which position he can see the 360-degree panorama.

Furthermore, the moving or still-picture projector 14 may be mounted such that it is rotatable about its optical axis. Thereby it is possible, when projecting standing or still pictures, to move the image appearing on the projection surface by rotating the projector. Instead of moving the projector, it is also possible to rotate the picture aperture only.

While we have disclosed several embodiments of the present invention, it is to be understood that these embodiments are given by example only and not in a limiting sense, the scope of the present invention being determined by the objects and the claim.

We claim:

A pickup and projection mirror for panoramic photography and panoramic projection at horizontal-plane angles of an image up to 360°, comprising a first mirror body having the configuration of a body of rotation, said first mirror body having a rotary axis and being formed by rotation of a convex circular arc about said axis, said first mirror body being provided at its vertex with an aperture disposed concentrically relative to said axis of said mirror body, and said convex circular arc having its center of the curvature of the arc outside of and off the axis of rotation of said first mirror body and the radius of said convex circular arc intersecting said axis at an acute angle, a further reflector disposed concentrically relative to and in front of said aperture of said first mirror body and opposite the reflecting outer surface of said first mirror body, said further reflector comprising a second mirror body having a reflecting outer surface and having the configuration of a plane mirror, and a beam of light projected and received, respectively, through said aperture and utilized for projection onto and for pickup from said further reflector, respectively, to be reflected within a predetermined angle over the outer surface of said first mirror body.

References Cited by the Examiner

UNITED STATES PATENTS 2,299,682   10/1942   Conant.
2,304,434   12/1942   Ayres _____ 88—24

FOREIGN PATENTS 704,471   2/1931   France.
73,605    9/1960   France.
          (1st add. to 1,204,643)

NORTON ANSHER, *Primary Examiner.*

WILLIAM MISIEK, *Examiner.*